(12) United States Patent
Werner et al.

(10) Patent No.: US 11,941,964 B2
(45) Date of Patent: Mar. 26, 2024

(54) SAFETY VIOLATION DETECTION

(71) Applicant: INTERNATIONAL BUSINESS MACHINES CORPORATION, Armonk, NY (US)

(72) Inventors: John S. Werner, Fishkill, NY (US); Aishwarya Gopinath, Meridian, ID (US); Arkadiy O. Tsfasman, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/807,063

(22) Filed: Jun. 15, 2022

(65) Prior Publication Data
US 2023/0410623 A1    Dec. 21, 2023

(51) Int. Cl.
| G08B 1/08 | (2006.01) |
| G06V 10/77 | (2022.01) |
| G06V 10/774 | (2022.01) |
| G08B 21/02 | (2006.01) |
| G08B 21/22 | (2006.01) |
| H04W 4/029 | (2018.01) |

(52) U.S. Cl.
CPC ......... *G08B 21/02* (2013.01); *G06V 10/7715* (2022.01); *G06V 10/774* (2022.01); *G08B 21/22* (2013.01); *H04W 4/029* (2018.02)

(58) Field of Classification Search
CPC .... G08B 21/02; G08B 21/22; G06V 10/7715; G06V 10/774; H04W 4/029
USPC ...................................... 340/539.1
See application file for complete search history.

(56) References Cited

U.S. PATENT DOCUMENTS

| 8,494,481 | B1 * | 7/2013 | Bacco | G08B 25/005 |
| | | | | 455/457 |
| 9,672,727 | B1 * | 6/2017 | Alexander | G08B 25/016 |
| 9,986,313 | B2 | 5/2018 | Schwarzkopf | |
| 10,540,877 | B1 | 1/2020 | Gersten | |
| 10,810,851 | B2 | 10/2020 | Baillargeon | |
| 2004/0138902 | A1 | 7/2004 | Baca et al. | |

(Continued)

OTHER PUBLICATIONS

Baker et al., "AI-based prediction of independent construction safety outcomes from universal attributes", ArXiv, Feb. 25, 2020, 28 Pages. https://arxiv.org/pdf/1908.05972.pdf.
Doherty et al., "Application of Artificial Intelligence in Electrical Safety." IEEE, 2022, 6 Pages. https://ieeexplore.ieee.org/stamp/stamp.jsp?tp-&arnumber=9188324.
Lawani, et al. "Designing drone game for construction site inspection." Frontiers in Built Environment, Feb. 17, 2022, vol. 7, Article 771703, 20 Pages. https://doi.org/10.3389/fbuil.2021.771703.

(Continued)

*Primary Examiner* — Tai T Nguyen
(74) *Attorney, Agent, or Firm* — Rakesh Roy

(57) ABSTRACT

A method, computer system, and a computer program product for safety violation detection is provided. The present invention may include receiving a camera feed of a facility. The present invention may also include analyzing the received camera feed using an AI model to detect a safety violation in the facility. The present invention may also include tracking a position of a user device in the facility associated with a user moving through the facility. The present invention may further include generating a proximity alert responsive to determining that the tracked position of the user device is within a predetermined proximity of the safety violation in the facility. The present invention may also include outputting the generated proximity alert to the user device for preventative action by the user.

20 Claims, 9 Drawing Sheets

(56) References Cited

U.S. PATENT DOCUMENTS

| | | | |
|---|---|---|---|
| 2007/0044539 A1* | 3/2007 | Sabol | G06Q 10/06 |
| | | | 73/19.01 |
| 2007/0195706 A1* | 8/2007 | Sink | H04L 41/00 |
| | | | 370/250 |
| 2015/0049190 A1* | 2/2015 | Galvez | G08B 25/002 |
| | | | 348/143 |
| 2016/0343238 A1* | 11/2016 | Olivares Arnaiz | H04W 4/80 |
| 2019/0122534 A1* | 4/2019 | McNutt | G08B 25/12 |
| 2020/0210912 A1 | 7/2020 | Buhulaiga et al. | |
| 2021/0279791 A1 | 9/2021 | Jacoby | |
| 2022/0012655 A1 | 1/2022 | Barak et al. | |
| 2023/0064675 A1* | 3/2023 | Higgins | H04N 23/60 |

OTHER PUBLICATIONS

Mell et al., "The NIST Definition of Cloud Computing", Recommendations of the National Institute of Standards and Technology, NIST Special Publication 800-145, Sep. 2011, 7 pages.

Palaniappan et al., "Artificial Intelligence (AI) Coupled with the Internet of Things (IoT) for the Enhancement of Occupational Health and Safety in the Construction Industry." AHFE, Springer Nature, 2021, pp. 31-38. https://link.springer.com/chapter/10.1007/978-3-030-80624-8_4.

Pishgar et al., "REDECA: A Novel framework to Review Artificial Intelligence and its Applications in Occupational Safety and Health", International Journal of Environmental Research and Public Health, Jun. 22, 2021, 42 Pages. https://www.mdpi.com/1660-4601/18/13/6705.

* cited by examiner

SAFETY VIOLATION DETECTION

BACKGROUND

The present invention relates generally to the field of computing, and more particularly to safety violation detection.

Workplace accidents may be devastating to employees and businesses. In addition to the impact on the individual, occupational injuries may affect the productivity of a business by drastically increasing work downtime (e.g., reduced productivity in the form of missed work or restricted work) and sometimes resulting in property damage. Slips/trips/falls and contact with objects and equipment are among the top causes of fatal occupational injuries. Studies have shown that for every fatal occupational injury, there are approximately 300 near misses and/or unsafe acts and 30 accidents with minor injuries. Aside from the injury itself, occupational injuries often relate to a rise in workers compensation insurance and may have legal implications.

SUMMARY

Embodiments of the present invention disclose a method, computer system, and a computer program product for safety violation detection. The present invention may include receiving a camera feed of a facility. The present invention may also include analyzing the received camera feed using an AI model to detect a safety violation in the facility. The present invention may also include tracking a position of a user device in the facility associated with a user moving through the facility. The present invention may further include generating a proximity alert responsive to determining that the tracked position of the user device is within a predetermined proximity of the safety violation in the facility. The present invention may also include outputting the generated proximity alert to the user device for preventative action by the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
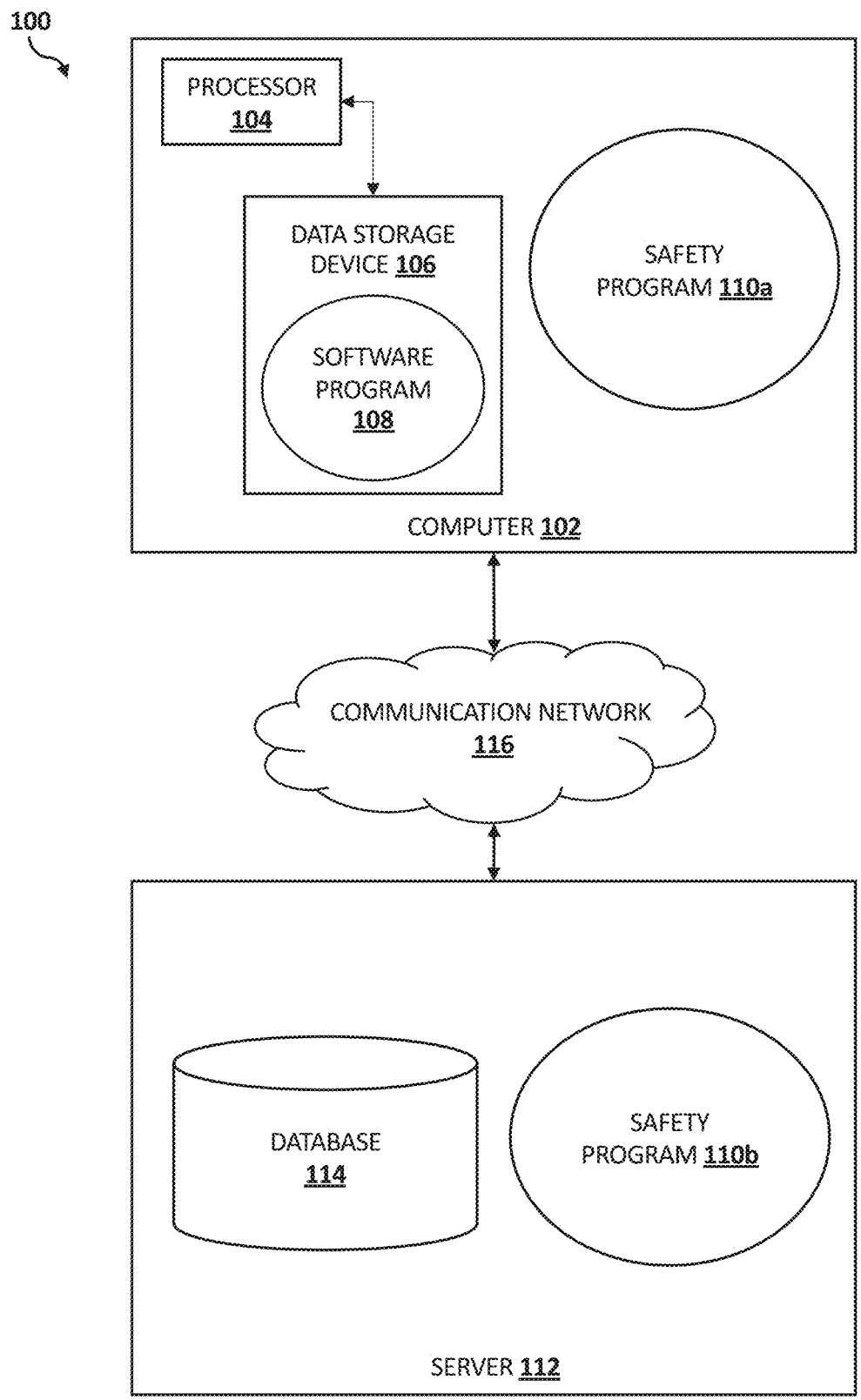
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for detecting and reporting safety violations (e.g., safety hazards) in a facility. As such, the present embodiment has the capacity to improve the technical field of detecting and reporting safety violations in a facility by implementing artificial intelligence (AI) that is capable of detecting violations to one or more facility safety specifications. More specifically, a safety program may receive a video feed of a facility with an associated location mapping. Then, the safety program may analyze the video feed, based on an AI model, to detect safety hazards identified by the AI model. Next, the safety program may track a user in the facility, based on the location of the user. Then, the safety program may generate an alert when the user is within a predetermined proximity of a safety hazard. Thereafter, the safety program may output the alert to the user for preventative action.

As described previously, workplace accidents may be devastating to employees and businesses. In addition to the impact on the individual, occupational injuries may affect the productivity of a business by drastically increasing work downtime (e.g., reduced productivity in the form of missed work or restricted work) and sometimes resulting in property damage. Slips/trips/falls and contact with objects and equipment are among the top causes of fatal occupational injuries. Studies have shown that for every fatal occupational injury, there are approximately 300 near misses and/or unsafe acts and 30 accidents with minor injuries. Aside from the injury itself, occupational injuries often relate to a rise in workers compensation insurance and may have legal implications.

In large facilities (e.g., sites/buildings), it may be difficult for site safety personnel to perform safety checks on a short-term basis (e.g., weekly). The disclosed embodiments may enable facility safety checks to occur more often to ensure the safety of workers and visitors. The disclosed embodiments may especially benefit users working alone in a facility (e.g., lab, warehouse, office, factory, datacenter, other workplace building or site) during times when the number of users on-site the facility is limited (e.g., during a pandemic). The disclosed embodiments may also provide the benefit of reducing travel time for site safety personnel who may manage multiple large sites and be required to drive or fly to alternate sites. It may also be difficult for site safety personnel to catch all violations due to differing safety standards in various jurisdictions (e.g., states). The disclosed embodiments may provide the benefit of identifying all violations that may be missed due to human error.

Therefore, it may be advantageous to, among other things, provide a way to enable an AI model to detect and report safety violations in a facility (e.g., lab, warehouse, office, factory, datacenter, other workplace building or site). In various embodiments, it may also be advantageous to continuously train the AI model for improved identification of safety violations over time. According to one embodiment, it may be advantageous to enable a first user to perform a scan of a facility with a camera while walking through the physical space. In one embodiment, it may also be advantageous to perform a visual analysis of the scan to detect violations to one or more safety specifications provided by, for example, the Occupational Safety and Health Administration (OSHA), the Centers for Disease Control and Prevention (CDC), the American National Standards Institute (ANSI), the National Fire Prevention Association (NFPA), or any other internal company standards. In one embodiment, it may further be advantageous to identify when a second user is within proximity of a detected violation within the physical space of the facility. In one embodiment, it may further be advantageous to generate an alert to the second user and/or highlight a nearby violation, in real-time, on an augmented reality (AR) display in the second user's field of vision.

According to one embodiment, the scan may be performed using a mobile device and/or cameras within the physical space of the facility. In one embodiment, the AI model may be trained to recognize violations and/or allowable conditions using supervised learning of tagged images with risk assessment scores. In one embodiment, a risk assessment score may be assigned to a detected violation. In some embodiments, the risk assessment score may be assigned based on a risk assessment matrix.

According to one embodiment, the first user may be provided a report of all detected violations and a timeframe in which detected violations need to be fixed. In one embodiment, the second user proximity may be detected by one or more of badge access (or other method of proving identity for entrance to the physical space) and/or mobile device location tracking. In one embodiment, an initial alert may be generated when the second user enters the physical space that includes one or more safety violations. In one embodiment, a proximity alert may be generated when the second user is within a threshold distance of the detected safety violation. In one embodiment, the threshold distance may be dependent upon the severity of the detected violation. In one embodiment, the alert may be generated if the risk assessment score is above a threshold value.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a safety program 110a. The networked computer environment 100 may also include a server 112 that is enabled to run a safety program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 7, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the safety program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the safety program 110a, 110b (respectively) to train and implement an AI model to detect and report safety violations in a facility. The disclosed embodiments are explained in more detail below with respect to FIGS. 2 to 6.

Figure 2:
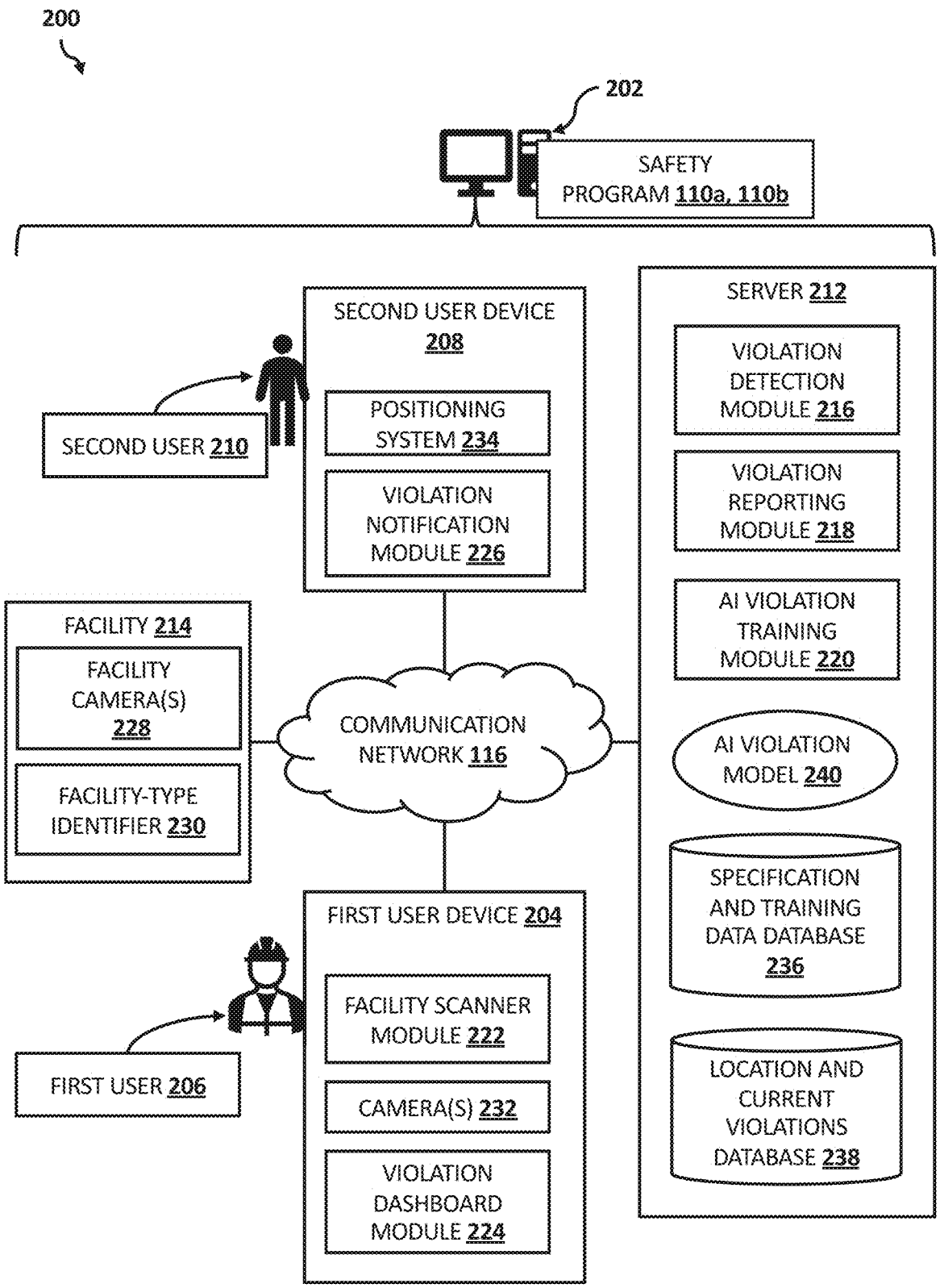
FIG. 2 is a schematic block diagram of a facility safety environment according to at least one embodiment.

Referring now to FIG. 2, a schematic block diagram of a facility safety environment 200 implementing the safety program 110a, 110b according to at least one embodiment is depicted.

According to one embodiment, the facility safety environment 200 may include one or more components (e.g., client computer 102; server computer 112; communication network 116) of the computer environment 100 discussed above with reference to FIG. 1. While programming and data of the exemplary embodiments may be stored and accessed remotely across several servers via the communication network 116, programming and data of the exemplary embodiments may alternatively or additionally be stored locally on as few as one physical computing device or amongst other computing devices than those depicted.

According to one embodiment, the facility safety environment 200 may include a computer system 202 having a tangible storage device and a processor that is enabled to run the safety program 110a, 110b. In one embodiment, the computer system 202 may include one or more computers, each having memory and at least one processor. In various embodiments, one or more computers of the computer system 202 may include a workstation, a personal computing device, a laptop computer, a desktop computer, a computing server, a thin-client terminal, a tablet computer, a smartphone, a smart watch or other smart wearable device, or other electronic devices.

According to one embodiment, the computer system 202 may include at least one first user device 204 associated with a first user 206, at least one second user device 208 associated with a second user 210, and at least one server 212 associated with a facility 214. In at least one embodiment, aspects of the computer system 202 may operate in a cloud computing service model, such as Software as a Service (SaaS), Platform as a Service (PaaS), or Infrastructure as a Service (IaaS). In one embodiment, the computer system 202 may also be implemented as a cloud computing deployment model, such as a private cloud, community cloud, public cloud, or hybrid cloud.

In one embodiment, the safety program 110a, 110b may include a single computer program or multiple program modules or sets of instructions being executed by the processor of the computer system 202 (e.g., first user device 204, second user device 208, server 212). For example, a first instance of the safety program 110a, 110b may be implemented by the server 212, including at least a violation detection module 216, a violation reporting module 218, and an AI training module 220. Further, a second instance of the safety program 110a, 110b may be implemented by the first user device 204, including at least a facility scanner module 222 and a violation dashboard module 224. Additionally, a third instance of the safety program 110a, 110b may be implemented by the second user device 208, including at least a violation notification module 226.

The safety program 110a, 110b may include routines, objects, components, units, logic, data structures, and actions that may perform particular tasks or implement particular abstract data types. The safety repair program 110a, 110b may be practiced in distributed cloud computing environments where tasks may be performed by local and/or remote processing devices which may be linked through the communication network 116. In one embodiment, the safety repair program 110a, 110b may include program instructions that may be collectively stored on one or more computer-readable storage media.

According to one embodiment, the first user device 204, the second user device 208, the server 212, and the facility 214 may be communicatively coupled via the communication network 116. As described previously, the communication network 116 may include various types of communication networks, such as a wide area network (WAN), local area network (LAN), a telecommunication network, a wireless network, a public switched network and/or a satellite network. In one embodiment, the communication network 116 may enable data to be transferred between the first user device 204, the second user device 208, the server 212, and the facility 214 using short-range wireless technologies, such as, for example, Wi-Fi, Bluetooth® (Bluetooth and all Bluetooth-based trademarks and logos are trademarks or registered trademarks of Bluetooth SIG, Inc. and/or its affiliates), near field communication (NFC), and radio-frequency identification (RFID).

According to one embodiment, the facility 214 may include any physical location or area where the safety program 110a, 110b may detect and report safety violations (e.g., lab, warehouse, office, factory, datacenter, other workplace building or site). In one embodiment, the facility 214 may include one or more facility cameras 228 and a facility-type identifier 230. In at least one embodiment, the facility 214 may include a subspace of a full site/building/campus. For example, a building may contain multiple facilities 214, such as, three labs, an office, and a warehouse, each of which may be the responsibility of a different first user 206 to scan, as will be described further below.

According to one embodiment, the facility camera 228 may include one or more cameras already located in facility 214 (e.g., security cameras) or may be part of one or more user devices (e.g., mobile device camera). In one embodiment, the camera feed/data (e.g., photos; video feed) from the facility camera 228 may be used as input by the violation detection module 216, as will be further detailed below. In some embodiments, the facility 214 may not include any facility cameras 228 and all camera data associated with the facility 214 may be captured using the first user device 204, as will be further detailed below.

According to one embodiment, the facility-type identifier 230 may include a tag (RFID) in the facility 214 that identifies the type of facility 214 (e.g., lab, warehouse, office, factory, datacenter, other workplace building or site) such that violation detection module 216 may determine which safety standards and which criteria to apply for the detection of safety violations. It is contemplated that different facility 214 types may include different safety violations or hazards. Non-limiting examples of data center hazards may include, high noise levels, moving large servers, unblocked and closed fire doors, and electrical cables across the top of a raised floor. Non-limiting examples of lab hazards may include, improperly stored chemicals and combustible substances, open and unaccompanied ladder, and electrical or thermal exposures. Non-limiting examples of lab hazards may include, improper material handling, improper clearances around robots, maximum weight capacity markings on shelves/racks to avoid tipping hazards, and clear walkways (e.g., clear of equipment, tools, hoses, cables, and other debris). In one or more embodiments, the facility-type identifier 230 may be manually set by the first user 206 using the first user device 204. In one or more embodiments, facility-type identifier 230 may be determined via a visual recognition system of the safety program 110a, 110b that may be trained to recognize facility spaces.

As described previously, the first user device 204 may be associated with the first user 206. In some embodiments, the first user device 204 may be referred to a physical location analysis device, a facility analysis device, and/or a facility manager device. In one embodiment, the first user 206 may include any individual that is responsible for maintaining safety within facility 214. For example, the first user 206 may include the owner and/or other stakeholders of the facility 214, site safety personnel, and/or any other employee that is responsible for capturing a camera feed for the safety program 110a, 110b.

According to one embodiment, the first user device 204 may include a mobile device or tablet. In one embodiment, the first user device 204 may include one or more cameras 232, the facility scanner module 222 of the safety program 110a, 110b, and the violation dashboard module 224 of the safety program 110a, 110b.

According to one embodiment, the facility scanner module 222 may be used to scan the facility 214 and send the camera data to the violation detection module 216. In one or more embodiments, the facility scanner module 222 may generate a notification on the first user device 204 which instructs the first user 206 to walk a path through the facility 214. In one embodiment, the facility scanner module 222 may provide a map of scanning progress or a preferred path through the space of facility 214. In one embodiment, the facility scanner module 222 may report if the first user device 204 missed an area or did not capture clear images of an area and will instruct the first user device 204 to track back to the areas that were missed or not captured clearly to ensure clear images/video feed are captured of the entire facility 214 or the portion of the facility 214 that may be of interest (e.g., if multiple companies share a divided facility 214). In one or more embodiments, the facility scanner module 222 may be implemented to capture a continuous feed (e.g., video feed) using the camera 232 of the first user device 204.

In one or more embodiments, the facility scanner module 222 may implement sensors (e.g., proximity sensor, position sensor, chemical sensor, lidar) and/or cameras to map out the current safety conditions of the facility 214 such that violation detection module 216 is capable of detecting safety violations.

According to one embodiment, the facility scanner module 222 may implement the camera 232 to capture images of the facility 214 and/or a continuous feed (e.g., video feed) of the facility 214 as the first user device 204 is taken through the space of the facility 214 during, for example, periodic facility safety audits (e.g., once per day, once per week, once per month).

In one or more embodiments, additional personnel (e.g., multiple first users 206) with access to facility 214 may perform a scan of part or all of the facility 214 (e.g., the full space may be covered by two or more employees (first users 206) simultaneously). In at least one embodiment, camera 232 may be external to the first user device 204, such as, for example, a body-worn camera that may continuously capture camera data throughout a workday. In one or more embodiments, images/video feed from the facility camera 228 may be used in conjunction with or in place of camera 232 of the first user device 204.

According to one embodiment, the violation dashboard module 224 may generate a dashboard on the first user device 204 to display a report of the safety violations that are detected by the violation detection module 216 and the location of the detected violations within the facility 214. In one embodiment, the output of the violation detection module 216 may be viewed on the first user device 204 based on the implementation of the violation dashboard module 224.

In one or more embodiments, violation dashboard module 216 may be part of a mobile device application (e.g., an instance of the safety program 110a, 110b) that may be downloaded onto the first user device 204 (e.g., mobile device or tablet), which may also contain facility scanner module 222 and the camera 232. In one embodiment, violation dashboard module 216 may provide in the report, a timeframe under which the first user 206 of the facility 214 has to perform a corrective action. In one embodiment, violation dashboard module 216 may instruct the first user 206 to the correct the violation (within the indicated timeframe) and rescan the area or the entire facility 214 to prove compliance with the safety standards. If compliance is not proved within the given timeframe, the violation dashboard module 216 may escalate the notification to other stakeholders (e.g., site safety personnel, management). In one embodiment, the timeframe for compliance (e.g., correcting a violation) provided by the violation dashboard module 216 may depend on the severity of the violation, the specification that is be utilized, and/or site safety rules.

Figure 3:
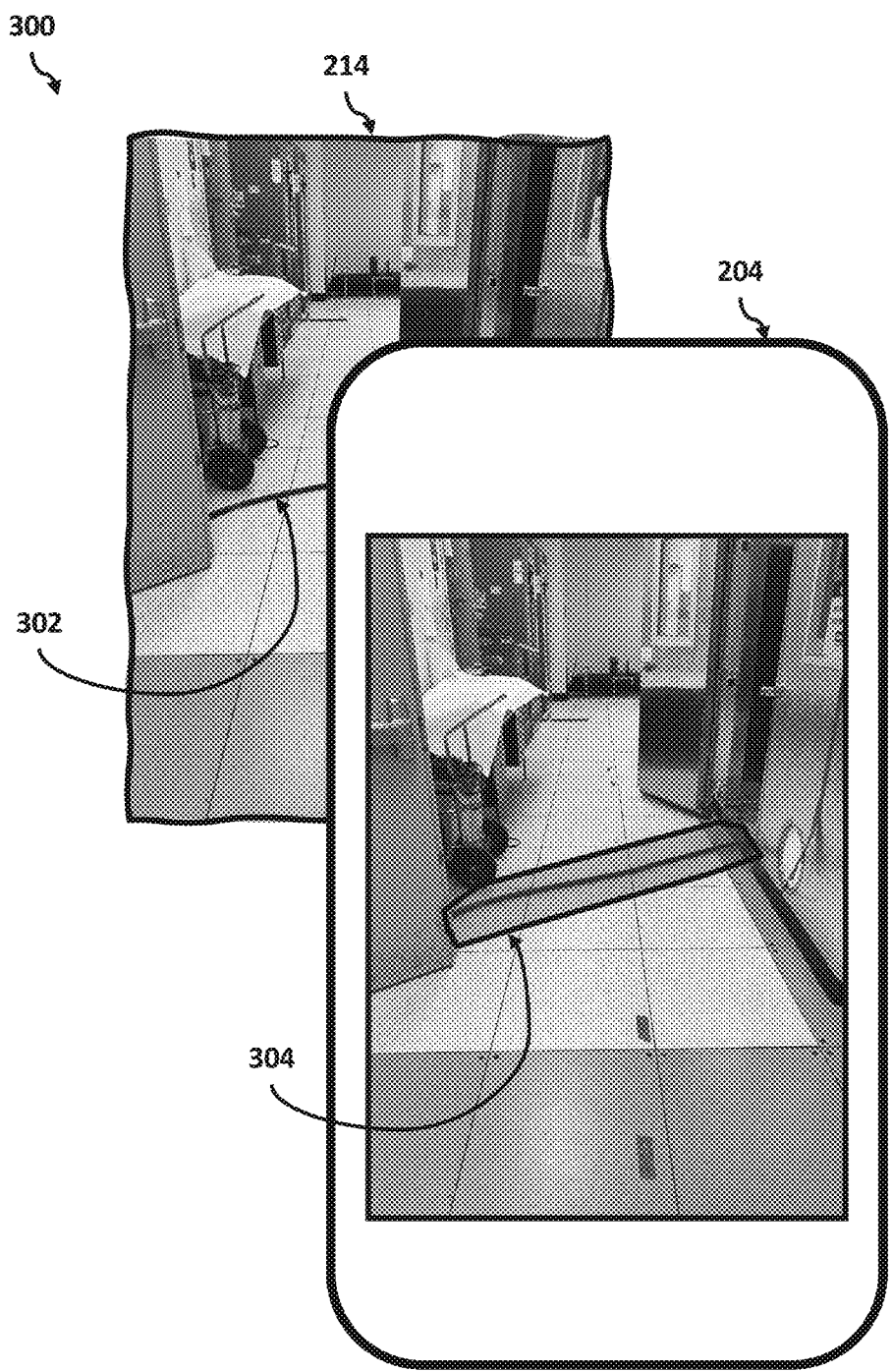
FIG. 3 is a schematic diagram of an augmented reality technique implemented in the facility safety environment according to at least one embodiment.

Referring briefly to FIG. 3, a schematic diagram 300 of an AR technique implemented by the safety program 110a, 110b according to at least one embodiment is depicted. In one embodiment, the violation dashboard module 216 may utilize AR techniques to highlight one or more safety violations 302 (e.g., wire across floor) detected within the facility 214. As shown in FIG. 3, the safety violation 302 in the facility 214 may be highlighted (e.g., highlighted safety violation 304) using AR techniques when the safety violation 302 is viewed through the first user device 204. Although the first user device 204 is illustrated as a mobile device, it is contemplated that any AR-enabled device (e.g., smart glasses) may be used to view the highlighted safety violation 304. In one embodiment, the violation dashboard module 216 may implement the AR techniques to display the highlighted safety violations 304 in real time during the scanning process. In other embodiment, the violation dashboard module 216 may implement the AR techniques to display the highlighted safety violations 304 after a full scan of the facility 214 is completed.

Continuing with FIG. 2, the second user 210 may include any person (e.g., employee, client) that may enter the facility 214. In one embodiment, the second user device 208 (e.g., mobile device and/or wearable device) associated with the second user 210 may include a positioning system 234. In one embodiment, the safety program 110a, 110b may interact with the positioning system 234 to determine whether the second user 210 is located in the facility 214, which facility 214 the second user 210 is located in, and the position of the second user 210 in the facility 214. In one embodiment, the positioning system 234 may implement Global Positioning System (GPS) technology and/or Indoor Positioning System (IPS) to determine the location and position of the second user 210.

According to at least one embodiment, a badge reader in the facility 214 may be implemented to scan a badge associated with the second user 210 to identify when the second user 210 enters the facility 214. In one or more embodiments, a work/visit schedule may be extracted from a calendar associated with the second user 210 such that the safety program 110a, 110b may generate a safety violation notification ahead of time if a future visit to the facility 214 is known.

According to one embodiment, the second user device 208 may also include the violation notification module 226 of the safety program 110a, 110b. In one embodiment, the violation notification module 226 may display the output of violation reporting module 218 to the second user device 208 to notify the second user 210 if there are any violations in the facility 214 that the second user 210 is currently located in. In one embodiment, the violation notification module 226 may also send additional notifications via the second user device 208 if the second user 210 is in close proximity to a detected violation.

In one or more embodiments, notifications from the violation notification module 226 may be in the form of sounds or vibration and may vary depending on the type of violations such that the second user 210 does not need to keep checking the second user device 208 (e.g., slow vibrations for a violation that poses a minor threat and fast vibrations for a violation that poses a significant safety threat).

In one or more embodiments, the violation notification module 226 may utilize AR techniques similar to the AR techniques illustrated in FIG. 3 with reference to the violation dashboard module 216. As such, in one embodiment, the violation notification module 226 may also utilize AR techniques to highlight one or more safety violations 302 detected within the facility 214 to assist the second user 210 (e.g., a visitor) in identifying and avoiding hazards (e.g., wire across floor highlighted in FIG. 3) within the facility 214. In one embodiment, the safety violation 302 in the facility 214 may be highlighted (e.g., highlighted safety violation 304) using AR techniques when the safety violation 302 is viewed through the second user device 208 (e.g., any AR-enabled device), in a manner similar to the first user device 204 illustrated in FIG. 3.

According to one embodiment, the server 212 associated with the facility 214 may include the violation detection module 216, the violation reporting module 218, the AI violation training module 220 of the safety program 110a, 110b, as described previously. In one embodiment, the server 212 may also include and/or be communicatively coupled to a specification and training data database 236 and a location and current violations database 238. In one embodiment, the specification and training data database 236 may include one or multiple databases. Similarly, the location and current violations database 238 may include one or multiple databases.

According to one embodiment, the specification and training data database 236 may contain one or more specifications (or links to the one or more specifications) that may be used by violation detection module 216 when analyzing facility 214. In one embodiment, storing the links to the one or more specifications may be beneficial to stay updated on any changes to the safety specification. In one embodiment, the specification and training data database 236 may also contain training data images for use by the AI violation training module 220 when training the AI violation model 240 (e.g., a visual recognition model).

According to one embodiment, the location and current violations database 238 is a constantly updating database that may store the floor plans for each facility 214 as well as the output data of violation detection module 216. As such, all of the current hazards/violations in each facility 214 (e.g., there may be many labs, offices, and/or a warehouse all within one site) may be known and accessible by the violation reporting module 218. In one embodiment, the location and current violations database 238 may be updated when the first user device 204 performs a new scan of the facility 214.

According to one embodiment, the violation detection module 216 may process input data (e.g., camera data such as images and video feed) from facility camera 228, facility scanner module 222, and camera 232 of the first user device 204. Then the violation detection module 216 may compare the input data to an AI violation model 240 generated by the AI violation training module 220 to determine if any safety violations are detected within the facility 214. In one embodiment, borderline or indeterminate images/video may also be tagged for assessment by a site safety expert to further train the AI violation model 240 as to whether the borderline or indeterminate finding is a violation.

According to one embodiment, one or more outputs from the violation detection module 216 may be stored in the location and current violation database 238. In one embodiment, the violation reporting module 218 may use the outputs from the violation detection module 216 (e.g., stored on location and current violation database 238) and user location data from the positioning system 234 to generate notifications to be sent to the second user 210 via the violation notification module 226 running on the second user device 208. In one or more embodiments, violation reporting module 218 may be trained to rank the detected violations such that different notifications may be provided to the second user device 208 based on the severity of the detected violation.

According to one embodiment, the AI violation training module 220 may include a machine learning module (e.g., supervised learning) which may utilize images of violations to one or more safety specifications (e.g., provided by OSHA, CDC, ANSI, NFPA, and any other internal company standards) and allowable conditions to create the AI violation model 240. The AI violation model 240 may then be used by the violation detection module 216 to flag new violations.

According to one embodiment, site safety personnel and those familiar with one or more safety specifications (e.g., subject matter experts (SMEs) may upload training images to the specification and training data database 236. In one embodiment, the training images may be entered as inputs into a neural network implemented by the AI violation training module 220, as will be discussed further with reference to FIG. 4. In one embodiment, the SMEs may tag or annotate the training images to specify the safety risks captured in the images. In one embodiment, the SMEs may also annotate the training images to indicate the safety specification that is being violated in the image (e.g., which clause of the specification applies). In one embodiment, the SMEs may also assign a risk assessment score or risk score to the training images according to a matrix as shown in Table 1, below.

TABLE 1

| LIKELIHOOD OF OCCURRENCE OR EXPOSURE FOR SELECT UNIT OF TIME | NEGLI-GIBLE (1) | MAR-GINAL (2) | CRITICAL (3) | CATASTRO-PHIC (4) |
|---|---|---|---|---|
| FREQUENT (5) | 5 | 10 | 15 | 20 |
| PROBABLE (4) | 4 | 8 | 12 | 16 |
| OCCASIONAL (3) | 3 | 6 | 9 | 12 |
| REMOTE (2) | 2 | 4 | 6 | 8 |
| IMPROBABLE (1) | 1 | 2 | 3 | 4 |

According to one embodiment, Table 1 indicates a risk assessment score calculated based on a risk assessment matrix associated with an accident occurrence likelihood (e.g., due to the safety violation) and a severity of consequence of the accident. Examples of the severity category consequences are provided in Table 2, below.

TABLE 2

| SEVERITY OF CONSEQUENCE CATEGORY EXAMPLES | | |
|---|---|---|
| SEVERITY CATEGORY | INJURY LEVELS | FINANCIAL LOSS LEVELS |
| CATASTROPHIC (4) | FATALITY/TOTAL DISABILITY | MORE THAN $1M |
| CRITICAL (3) | HOSPITALIZATION | $100-$1M |
| MARGINAL (2) | MINOR/MAJOR INJURY | $10-$100K |
| NEGLIGIBLE (1) | FIRST AID | $0-$10K |

According to one embodiment, the SMEs may assign the risk score (from Table 1) to each training image as the corresponding correct neural network output. In other words, risk scores may be assigned to the training data images such that new risk scores may be provided by the AI violation model 240 to newly detected violations. In one embodiment, a risk score range (e.g., 3-8) may be provided for a specific violation (e.g., a single 12 American Wire Gauge (AWG) wire may receive a risk score of 3 while three 4/0 AWG wires within a specified distance may receive a risk score of 8).

According to one embodiment, the AI violation model 240 may also be trained to indicate an urgency of the corrective action based on the risk score, as shown in Table 3 below. The urgency of action may be used to determine a timeframe given to a user (e.g., first user 206) within which the violation needs to be corrected. In one embodiment, a higher value risk score may indicate a more dangerous violation that may need more immediate corrective action (e.g., a cart blocking an air conditioning unit may get a lower risk score than a cart blocking a fire door).

TABLE 3

| RISK LEVEL | RISK SCORE | ACTION |
| --- | --- | --- |
| VERY HIGH | 12 OR GREATER | IMMEDIATE ACTION REQUIRED |
| HIGH | 8-10 | REMEDIAL ACTION REQUIRED, HIGH PRIORITY |
| MODERATE | 4-6 | REMEDIAL ACTION REQUIRED, SUGGESTED |
| LOW | 1-3 | REMEDIAL ACTION REQUIRED, DISCRETIONARY |

Figure 4:
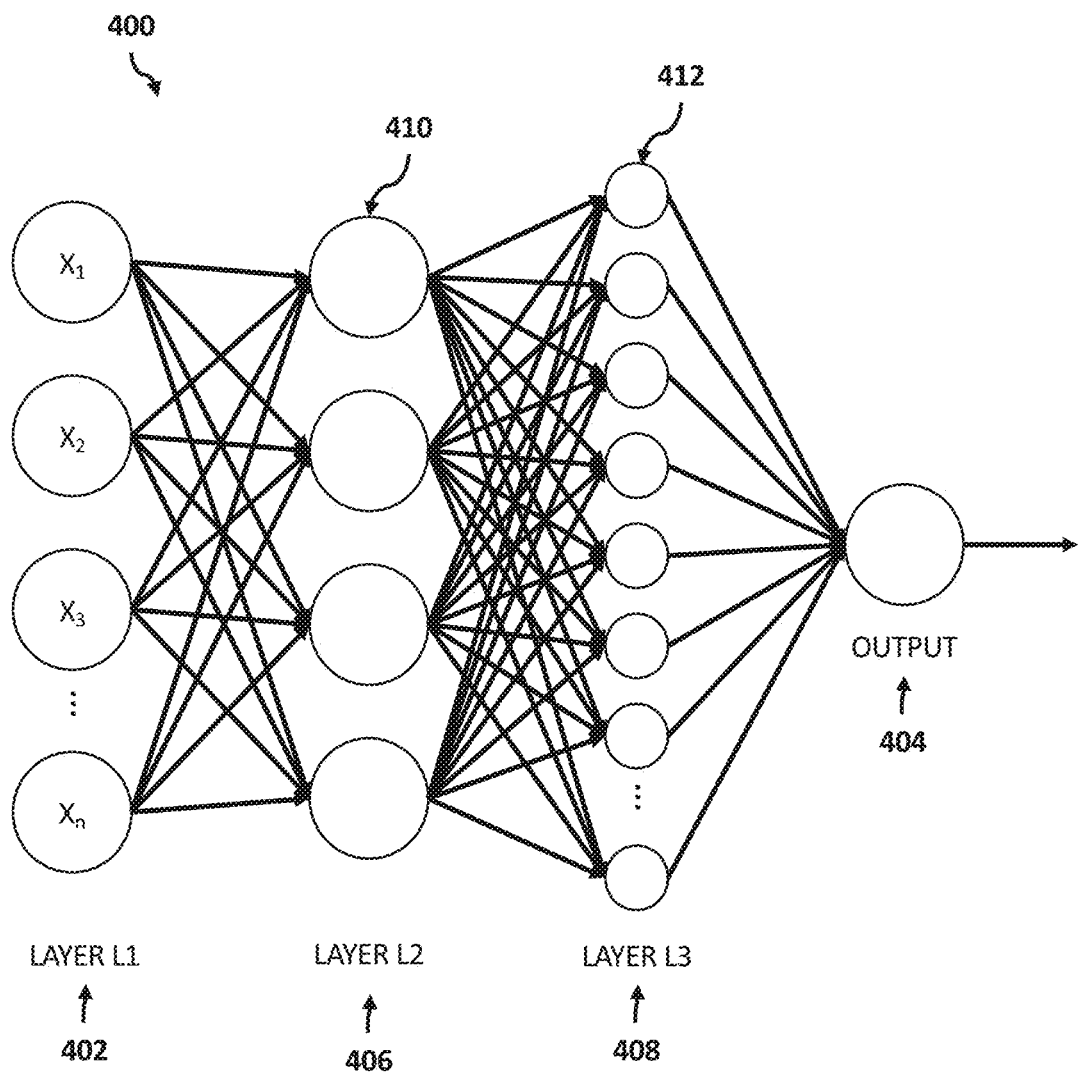
FIG. 4 is a schematic block diagram of a neural network implemented in the facility safety environment according to at least one embodiment.

Referring now to FIG. 4, a schematic block diagram of a neural network 400 implemented by the safety program 110a, 110b according to at least one embodiment is depicted.

According to one embodiment, neural network 400 may be implemented by the AI violation training module 220 to generate the trained AI violation model 240. In some embodiments, the neural network 400 may be used for supervised training of the AI violation model 240.

According to one embodiment, the neural network 400 may include an input layer 402 (e.g., also referred to as layer L1 402) and an output layer 404, as illustrated in FIG. 4. In one embodiment, the neural network 400 may also include a plurality of hidden layers between the input layer 402 and the output layer 404. In one embodiment, as illustrated in FIG. 4, the neural network 400 may include a hidden layer L2 406 and a hidden layer L3 408.

In one embodiment, the training images may be entered as inputs into a set of neurons (e.g., $X_1$-$X_n$) of the layer L1 402. In one embodiment, hidden layer L2 406 may include a set of L2 neurons 410 that may perform visual recognition to determine which physical environment is recognized in the training images and which safety specification or standards may apply (e.g., OSHA (Standards 29 CFR 1910), ANSI (ANSI Z358.1—standards for emergency wash; ANSI/ASSE A1264—safety standards for workplace surfaces), NFPA (NFPA 70E—standards for electrical safety in the workplace). In one embodiment, each neuron 410 of the hidden layer L2 406 may correspond to a different environment type of the facility 214 (e.g., lab, warehouse, office). In one or more embodiments, the facility-type identifier 230 may be used as an input for the hidden layer L2 406 such that only the neuron 410 corresponding to a facility type is utilized in the hidden layer L2 406 to minimize unnecessary processing in the other neurons of the hidden layer L2 406. It is contemplated that minimizing unnecessary processing in the other neurons of the hidden layer L2 406 may reduce the utilization of computational resources. Although the physical environment (e.g., facility 214) is described with reference to hidden layer L2 406, in at least one embodiment, multiple hidden layers may be implemented to perform visual recognition to determine which physical environment is recognized in the training images and which safety specification or standards may apply.

According to one embodiment, the hidden layer 3 408 may include a set of L3 neurons 412 that may perform the visual recognition to identify which violations exist in the input images (if any) and output an associated risk assessment score according to the matrix of Table 1, as described above. According to at least one embodiment, multiple hidden layers may be implemented to perform visual recognition to identify which violations exist in the input images (if any) and output an associated risk assessment score according to the matrix of Table 1.

In one embodiment, each neuron 412 may correspond to a different violation (e.g., exposed chemicals, blocked circuit breaker panel, trip hazards, unsafe stacking of items on top of cabinets). In some embodiments, the neurons 412 may also be included for non-violations or allowable actions that have no risk (e.g., clean floor with no spills or trip hazards, unblocked emergency exits).

According to one embodiment, the output layer 404 may then combine all the outputs from the hidden layer 3 408 to identify a set of one or more violations that were found in the input images. In some embodiments, one or more activation functions, biases, and weights may be adjusted with supervised training such that the AI violation model 240 outputs the desired result as specified by the SMEs. In at least one embodiment, one input image may result in multiple violations detected in the output. It is contemplated that the AI violation model 240 may be continuously trained with new images that come in during implementation of the disclosed embodiments.

Figure 5:
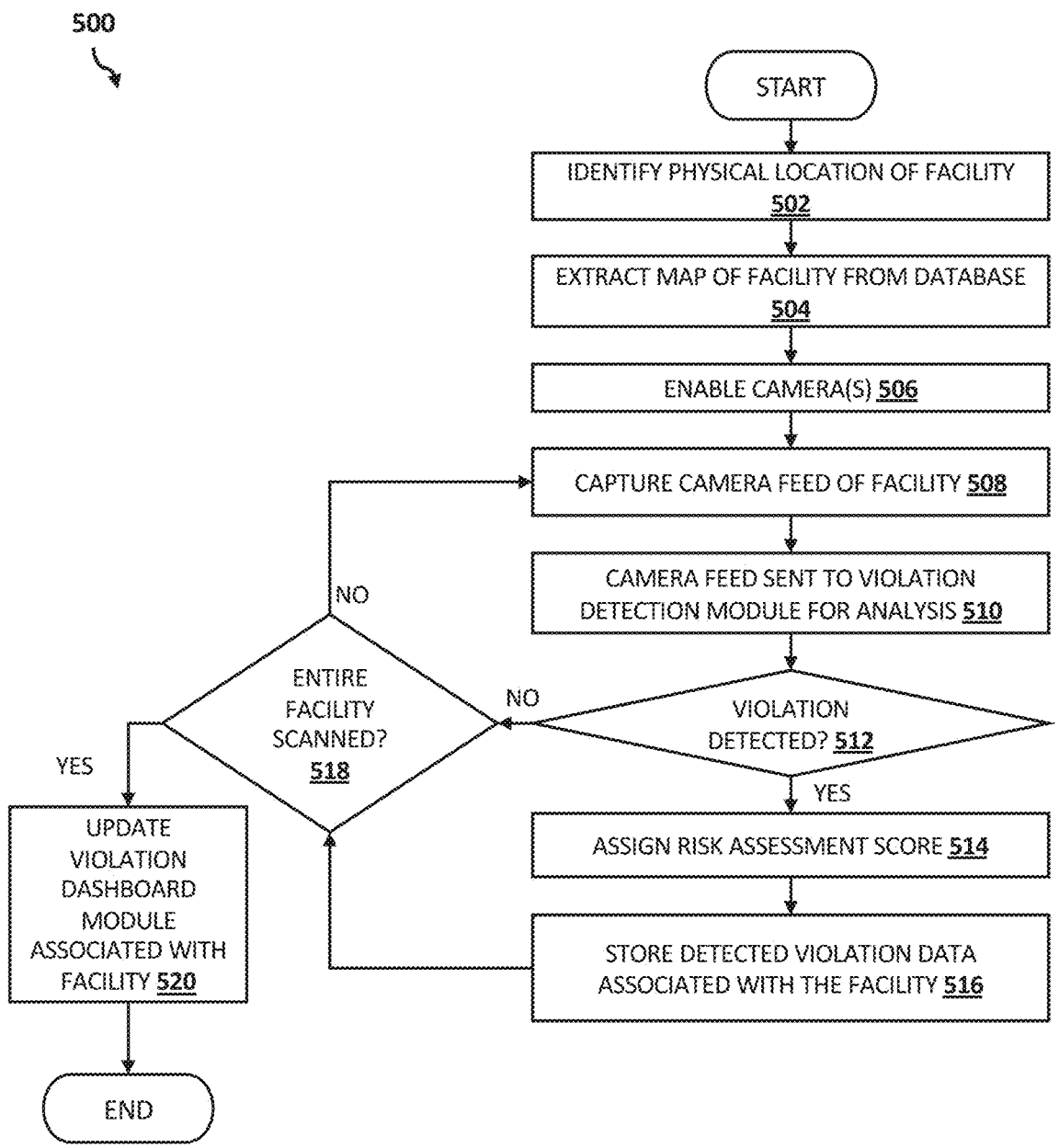
FIG. 5 is an operational flowchart illustrating an exemplary violation detection process according to at least one embodiment.

Referring now to FIG. 5, an operational flowchart illustrating the exemplary violation detection process 500 used by the safety program 110a, 110b according to at least one embodiment is depicted.

According to one embodiment, the violation detection process 500 may be executed by the violation detection module 216 (e.g., of the safety program 110a, 110b) of server 212. In one embodiment, the violation detection module 216 may receive input from the facility scanner module 222 and the cameras 232 of the first user device 204 and facility cameras 228 of the facility 214 to detect facility safety violations and provide outputs/updates via the violation dashboard module 224. In one embodiment, the violation detection process 500 may be executed periodically at an interval determined by one or more of the first user device 204, management, and/or other site safety personnel.

At 502, a physical location is identified. According to one embodiment, the violation detection module 216 may identify the physical location of the facility 214 where the scan for violations may be performed. In one embodiment, identification of the physical location may be implemented using a positioning system (e.g., GPS/IPS) and/or manually by the first user device 204 (e.g., manually entered).

Then at 504, a map of the facility is extracted from a database. According to one embodiment, the violation detection module 215 may extract the map (e.g., floor plan) of the facility 214 from the location and current violations database 238. According to at least one embodiment, if a map of the facility 214 does not exist, a map may be built and stored for future use based on performing an initial scan by walking through the facility 214 (e.g., by the first user 206).

Then at 506, one or more cameras are enabled. According to one embodiment, the violation detection module 215 may enable camera(s) 232 for the first user device 204 to record video that may later be analyzed to search for violations. If facility cameras 228 are present in the facility 214 (e.g., security cameras), video from these cameras may be extracted for analysis or, in some embodiments, may be analyzed periodically or in real-time.

Then at 508, camera feed of the facility is captured. According to one embodiment, the safety program 110a, 110b may enable the first user device 204 to begin/continue scanning the physical location of the facility 214 to capture all necessary camera feed (e.g., video feed and/or images) to cover the full area of the facility 214. In one embodiment, the facility scanner module 222 of the safety program 110a, 110b may provide instructions to the first user 206 via the first user device 204 on which way the first user 206 should move to cover the entire area of the facility 214.

Then at 510, the camera feed is transmitted to violation detection module for analysis. According to one embodiment, the safety program 110a, 110b may transmit the camera feed collected during the scan of facility 214 to the server 212 for analysis by violation detection module 216. In one embodiment, the violation detection module 216 may use the AI violation model 240 (e.g., generated by the AI violation training module 220) to detect all possible violations in comparison to one or more safety specifications, as described previously.

Then at 512, an assessment is made to determine if one or more violations are detected within the facility. According to one embodiment, the violation detection module 216 of the safety program 110a, 110b determines if violations are detected (e.g., using the AI violation model 240) in the camera feed captured from the facility 214.

According to one embodiment, if one or more violations are detected in the facility 214 (e.g., "Yes" branch of 512), the violation detection process 500 moves to 514 to assign a risk assessment score to each detected violation (e.g., a risk assessment score of 5 out of a maximum of 20). In one embodiment, the risk assessment score may be calculated by the AI violation model 240. In one or more embodiments, a risk assessment matrix may be used as shown in Table 1, above. In one embodiment, a higher value risk assessment score may indicate a more dangerous violation that may need more immediate corrective action (e.g., a cart blocking an air conditioning unit would get a lower risk score than a cart blocking a fire door). As previously described, risk assessment scores can be assigned to the training data images when training the AI violation model 240 such that risk assessment scores can be provided to newly detected violations.

Then at 516, the detected violation data associated with the facility is stored. According to one embodiment, the safety program 110a, 110b may update the location and current violations database 238 with the detected violation and the position of the detected violation within the facility (e.g., items stacked on top of cabinets at tile location B12 R15 in the northeast corner of the lab).

According to one embodiment, if no violation is detected at 512 (e.g., "No" branch of 512) or after executing 516, the violation detection process 500 may move to 518 to determine if the entire facility has been scanned. In one embodiment, the facility may be divided into different sections, rooms, and/or parts.

According to one embodiment, if the entire facility 214 has not been scanned (e.g., "No" branch of 518), the violation detection process 500 may return back to 508 to continue capturing the camera feed of the facility 214. For example, the safety program 110a, 110b may instruct the first user 206 (e.g., via the first user device 204) to move to the next section, room, and/or part of the facility 214. In one embodiment, the safety program 110a, 110b may provide information on the first user device 204 indicating a direction to move or point the first user device 204.

According to one embodiment, if the first user device 204 has finished scanning the entire facility 214 (e.g., "Yes" branch of 518), the violation detection process 500 may proceed to 520 to update the violation dashboard module 224 with each detected violation and its correlating position before ending the violation detection process 500.

According to one embodiment, the safety program 110a, 110b may enable the first user device 204 to initiate the violation detection process 500 at any time to demonstrate that a violation has been fixed and thus update both the location and current violations database 238 and the violation dashboard module 224.

Figure 6:
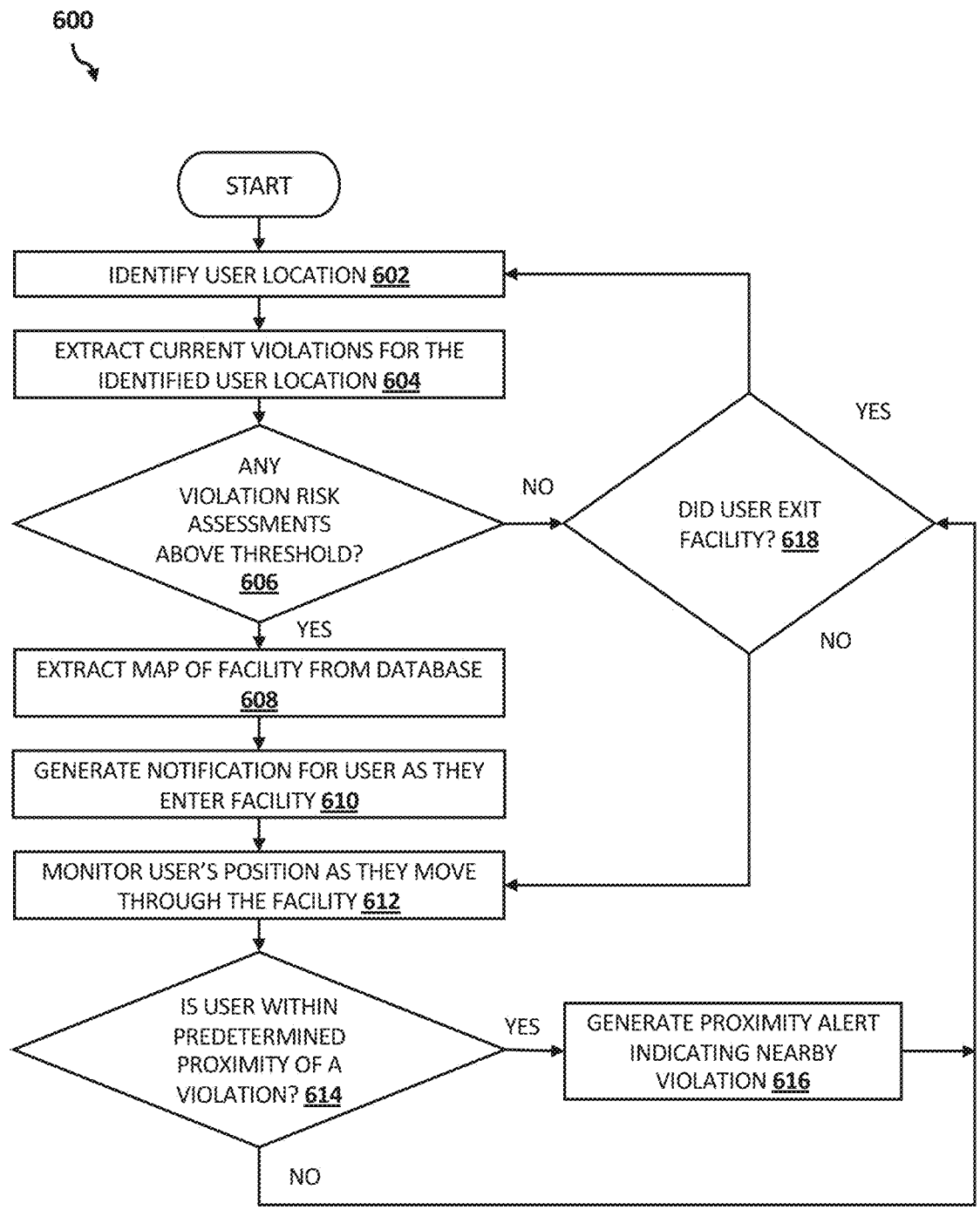
FIG. 6 is operational flowchart illustrating an exemplary violation reporting process according to at least one embodiment.

Referring now to FIG. 6, an operational flowchart illustrating the exemplary violation reporting process 600 used by the safety program 110a, 110b according to at least one embodiment is depicted.

According to one embodiment, the violation reporting process 600 may be executed by the violation reporting module 218 of the safety program 110a, 110b, which may take input from the positioning system 234 (e.g., GPS/IPS) of the second user device 208 and may provide output of the current safety violations to the second user 210 via the violation notification module 226 of the second user device 208.

At 602, a user location is identified. According to one embodiment, the user in the violation reporting process 600 may refer to the second user 210, described with reference to FIG. 2. As such, in one embodiment, the user (e.g., second user 210 in FIG. 2) may include any person (e.g., employee, client) that may enter the facility 214. In one embodiment, the safety program 110a, 110b (e.g., via the violation reporting module 218) may identify the user location within the facility 214 based on a position of a user device (e.g., second user device 208) that is associated with user entering the facility 214.

In one embodiment, the user location may be determined via the positioning system 234 (e.g., GPS/IPS) of a user device (e.g., second user device 208). In one or more embodiments, badge access may be used to determine the user's location in place of or in addition to the positioning system 234 of the user device. According to at least one embodiment, the safety program 110a, 110b may transmit a permission seeking message to the user (e.g., via the second user device 208) to seek permission to identify and/or monitor the user location/position within the facility 214 for the purposes of notifying the user of potential safety violations in the facility 214. In such embodiments, once the user provides the requisite permission, the safety program 110a, 110b (e.g., via the violation reporting module 218) may identify/monitor the user location within the facility 214.

Then at 604, current violations for the identified user location are extracted. In one embodiment, the safety program 110a, 110b may extract the current violations (e.g., from the location and current violations database 238) for the identified facility 214 (e.g., user location) that was determined at 602. In one embodiment, the current violations may include the violations that exist/were detected after the last time the violation detection process 500 (FIG. 5) was executed in the user's current physical location (e.g., the facility 214 in which the second user 210 is located).

Then at 606, the violation reporting process 600 determines if any violations exist with a risk assessment score above a threshold. According to one embodiment, the safety program 110a, 110b (e.g., via the violation reporting process 600) determines if any violations exist at the user's current physical location (e.g., the facility 214 in which the second user 210 is located) that includes a risk assessment score above a predetermined risk threshold. For example, the safety program 110a, 110b may set the predetermined risk threshold at a score of 5 out of a maximum 20. In this example, a cart blocking a fire door may receive a risk assessment score of 7 which is above the predetermined risk threshold while a cart blocking an air conditioning unit may receive a risk assessment score of 4 which is below the predetermined risk threshold. While both of these are violations that should be addressed by a person in charge of facility 214, the cart blocking an air conditioning unit may not pose imminent threat to the safety of second user 210 and in some embodiments, it may be deemed that the user may not need to be notified of the air conditioning unit being blocked.

In one or more embodiments, the user may only be given an initial warning (e.g., via the user device) for violations below the risk threshold but may not receive secondary warnings since the violation has low risk. In one or more embodiments, the user may not be given an initial warning for violations below the risk threshold but may receive a notification later if the user is in close proximity to the violation even though the violation has low risk. According to at least one embodiment, a risk threshold may not be used and all violations that are provided to the first user device 204 (e.g., via the violation dashboard module 224) and/or stored in the location and current violations database 238 may also be provided to the violation reporting module 218 for notifying the user (e.g., via second user device 208).

According to one embodiment, if one or more violations exist with a risk assessment score above a risk threshold (e.g., "Yes" branch of 606), the violation reporting process 600 may move to 608 to extract a map (e.g., floor plan) of the facility associated with the user. In one embodiment, the safety program 110a, 110b may extract a map of the facility 214 in which the user is located from the location and current violation database 238.

Then at 610, a notification is generated for the user as the user enters the facility. According to one embodiment, the safety program 110a, 110b may generate the notification as the user enters the physical location of the facility 214 (e.g., as the user opens a door to a lab). According to one embodiment, 610 may be executed as an initial notification to the user to let them know of all the violations that exist in the facility 214 such that the user is aware of potential dangers and their relative location within the facility 214 (e.g., liquid spill in the northeast corner; open electrical face plate—access to high voltage at tile location B12 R15). In one or more embodiments, the notification may be generated on the second user device 208 (e.g., user's mobile device, smart watch, or other wearable device). In one or more embodiments, the generated notification may include a map of facility 214 with markers indicating where the current violations exist in the facility 214.

Then at 612, a user's position is monitored as the user moves through the facility. According to one embodiment, the safety program 110a, 110b may monitor the user's position (e.g., based on the position of the user device in the facility 214) once the user provides the requisite permission, as described previously at 602. In one embodiment, the location reading at 612 may be more specific than at 602 in that the user's position is tracked as the user moves through the space of the facility 214 and, in one or more embodiments, may be plotted on the map (e.g., extracted at 608 from the location and current violations database 238).

Then at 614, the violation reporting process 600 determines if the user is within a predetermined proximity of a violation. According to one embodiment, the predetermined proximity of a violation may include a threshold distance from a safety violation. In one embodiment, the predetermined proximity may be set by the safety program 110a, 110b and/or one or more first users 206 associated with the facility 214 (e.g., owner and/or other stakeholders of the facility 214, site safety personnel, and/or any other employee that is responsible for maintaining safety at the facility 214). In one embodiment, the safety program 110a, 110b may enable the user (e.g., second user 210) entering the facility 214 to set the predetermined proximity distance. In one or more embodiments, the predetermined proximity may be set to vary based on the severity (e.g., risk assessment score) of the safety violation (e.g., a trip hazard may have a 20 foot threshold and exposed high voltage may have a 40 foot threshold).

If the violation reporting process 600 determines that the user is within the predetermined proximity of the safety violation (e.g., "Yes" branch of 614), the violation reporting process 600 may move to 616 to generate a proximity alert indicating a nearby violation. In one embodiment, the generated proximity alert may be transmitted to the user device to instruct the user to perform a preventative action (e.g., avoid the location of the safety violation; take a detour) to avoid a negative consequence of the safety violation.

According to one embodiment, the safety program 110a, 110b may generate the proximity alert that is specific to the nearby violation. In one or more embodiments, the alert may be a sound and/or vibration transmitted from the user device (e.g., mobile device and/or wearable) where different violation types may have different sounds and/or vibration patterns such that the user does not have to look at the user device to determine the violation type of the nearby violation and/or constantly check the user device if the facility 214 has many violations. In one or more embodiments, the generated proximity alert may include a notification on the user device with more specific information about the nearby violation than what was indicated in the notification (e.g., initial alert) generated at 610.

According to one embodiment, if the violation reporting process 600 determines that no violations exist with a risk assessment score above a threshold (e.g., "No" branch of 606) or if the user is not within a threshold distance of a violation (e.g., "No" branch of 614) or after executing 616, the violation reporting process 600 may move to decision 618 to determine if the user has exited the facility 214. In one embodiment, the safety program 110a, 110b may determine if the user has exited the facility 214 by extracting the user's position within the facility 214 using the positioning system 234 (e.g., GPS/IPS) of the user device (e.g., second user device 208).

According to one embodiment, if the violation reporting process 600 determines that the user has not exited the facility 214 (e.g., "No" branch of 618), the violation reporting process 600 may loop back to 612 to continue monitoring the user's position within the facility 214. However, if the violation reporting process 600 determines that the user has exited the current facility 214 (e.g., "Yes" branch of 618), the violation reporting process 600 may loop back to block 602 to continue monitoring the user to determine if the user reenters the current facility 214 or enters a different facility 214.

Accordingly, the safety program 110a, 110b may improve the functionality of a computer because the safety program 110a, 110b may enable the computer to generate an AI model to detect and report safety violations in a facility (e.g., lab, warehouse, office, factory, datacenter, other workplace building or site). In various embodiments, the safety program 110a, 110b may enable the computer to capture a camera feed from the facility. In one embodiment, the safety program 110a, 110b may enable the computer to perform a visual analysis of the camera feed to detect safety violations to one or more facility safety specifications (e.g., OSHA, CDC, ANSI, NFPA, and/or internal safety standards). In various embodiments, the safety program 110a, 110b may enable the computer to identify when a user (e.g., visitor to the facility) is within proximity of a detected violation within the facility. In various embodiments, the safety program 110a, 110b may enable the computer to generate an alert to the user and/or highlight the violation on an AR display in real-time for the user.

It may be appreciated that FIGS. 2 to 6 provide only an illustration of one embodiment and do not imply any limitations with regard to how different embodiments may be implemented. Many modifications to the depicted embodiment(s) may be made based on design and implementation requirements.

Figure 7:
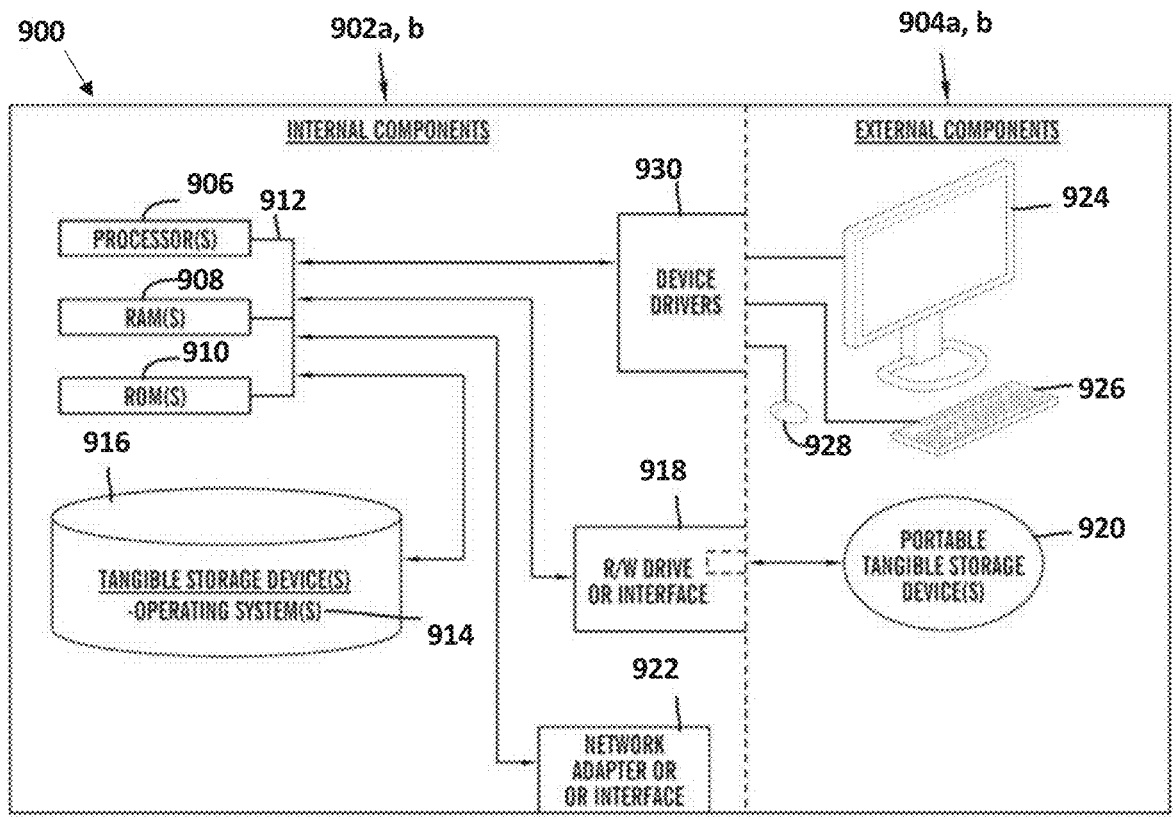
FIG. 7 is a block diagram of internal and external components of computers and servers depicted in FIG. 1 according to at least one embodiment.

FIG. 7 is a block diagram 900 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 7. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the safety program 110a in client computer 102, and the safety program 110b in network server 112, may be stored on one or more computer-readable tangible storage devices 916 for execution by one or more processors 906 via one or more RAMs 908 (which typically include cache memory). In the embodiment illustrated in FIG. 7, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the safety program 110a and 110b can be stored on one or more of the respective portable computer-readable tangible storage devices 920, read via the respective RAY drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G, 4G, and/or 5G wireless interface cards or other wired or wireless communication links. The software program 108 and the safety program 110a in client computer 102 and the safety program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the safety program 110a in client computer 102 and the safety program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
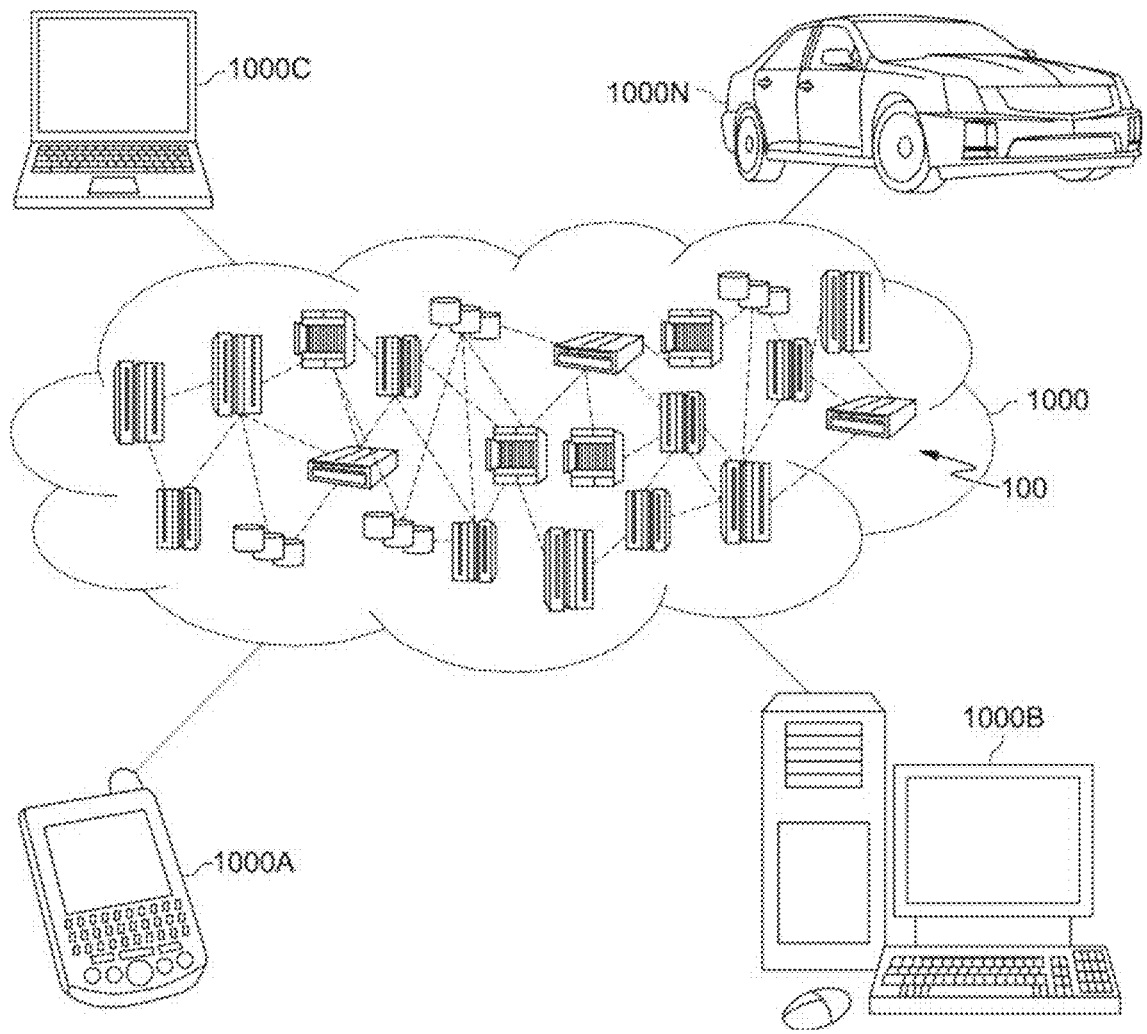
FIG. 8 is a block diagram of an illustrative cloud computing environment including the computer system depicted in FIG. 1, in accordance with an embodiment of the present disclosure.

Referring now to FIG. 8, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 8 are intended to be illustrative only and that computing nodes 100 and cloud computing environment 1000 can communicate with any type of computerized device over any type of network and/or network addressable connection (e.g., using a web browser).

Figure 9:
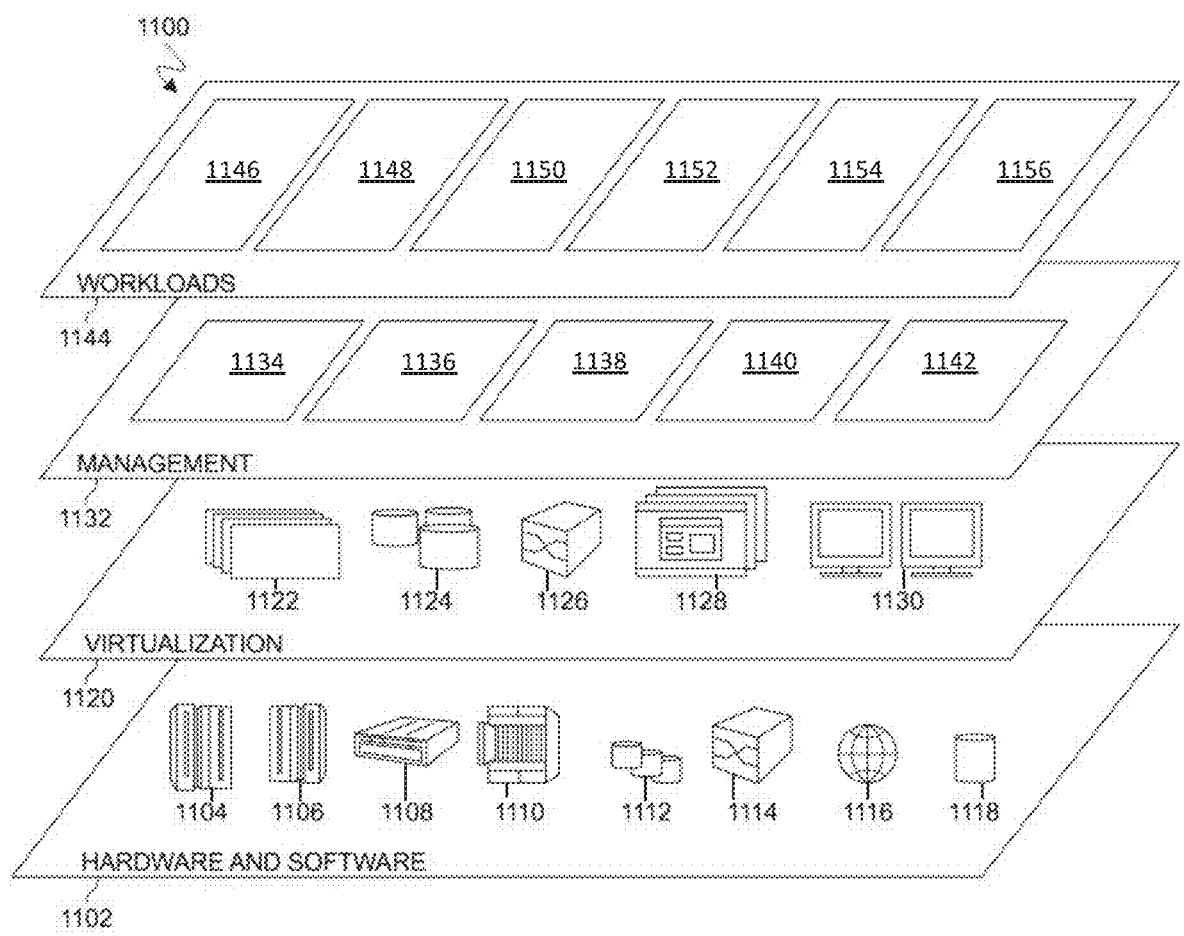
FIG. 9 is a block diagram of functional layers of the illustrative cloud computing environment of FIG. 8, in accordance with an embodiment of the present disclosure.

Referring now to FIG. 9, a set of functional abstraction layers 1100 provided by cloud computing environment 1000 is shown. It should be understood in advance that the components, layers, and functions shown in FIG. 9 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and safety violation detection 1156. A safety program 110a, 110b provides a way to train and implement an AI model to detect and report safety violations in a facility.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving a camera feed of a facility;
   analyzing the received camera feed using an artificial intelligence (AI) model to detect a safety violation in the facility;
   tracking a position of a user device in the facility, wherein the user device is associated with a user moving through the facility;
   generating a proximity alert responsive to determining that the tracked position of the user device is within a predetermined proximity of the safety violation in the facility; and
   outputting the generated proximity alert to the user device for preventative action by the user to avoid the safety violation in the facility.

2. The method of claim 1, further comprising:
   training the AI model to recognize a plurality of safety violations based on supervised learning of a set of training images tagged with a corresponding set of risk assessment scores.

3. The method of claim 2, further comprising:
   training the AI model to recognize the plurality of safety violations based on a set of safety specifications.

4. The method of claim 3, wherein the set of safety specifications is selected from the group consisting of:
   Occupational Safety and Health Administration (OSHA) specifications, Centers for Disease Control and Prevention (CDC) specifications, American National Standards Institute (ANSI) specifications, National Fire Prevention Association (NFPA) specifications, and internal specifications.

5. The method of claim 1, further comprising:
   receiving the camera feed of the facility from a facility manager device; and
   providing the facility manager device with a report of the safety violation detected in the facility, wherein the report indicates a timeframe for correcting the safety violation detected in the facility.

6. The method of claim 1, wherein a risk assessment score is assigned to the safety violation detected in the facility; and
   wherein the predetermined proximity is based on the risk assessment score associated with the safety violation detected in the facility.

7. The method of claim 6, wherein the risk assessment score is assigned to the safety violation based on a risk assessment matrix associated with an accident occurrence likelihood and a severity of consequence.

8. The method of claim 1, further comprising:
   generating an initial alert for the user device responsive to determining that the user device is entering the facility including the safety violation.

9. The method of claim 1, wherein the generated proximity alert is responsive to determining that the safety violation detected in the facility includes a risk assessment score that is above a risk assessment threshold.

10. The method of claim 1, wherein the safety violation detected in the facility is highlighted on an augmented reality display associated with the user, responsive to determining that the safety violation is in a field of vision of the user.

11. A computer system for safety violation detection, comprising:
    one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
    receiving a camera feed of a facility;
    analyzing the received camera feed using an artificial intelligence (AI) model to detect a safety violation in the facility;
    tracking a position of a user device in the facility, wherein the user device is associated with a user moving through the facility;
    generating a proximity alert responsive to determining that the tracked position of the user device is within a predetermined proximity of the safety violation in the facility; and
    outputting the generated proximity alert to the user device for preventative action by the user to avoid the safety violation in the facility.

12. The computer system of claim 11, further comprising:
    training the AI model to recognize a plurality of safety violations based on supervised learning of a set of training images tagged with a corresponding set of risk assessment scores.

13. The computer system of claim 12, further comprising:
    training the AI model to recognize the plurality of safety violations based on a set of safety specifications.

14. The computer system of claim 13, wherein the set of safety specifications is selected from the group consisting of:
    Occupational Safety and Health Administration (OSHA) specifications, Centers for Disease Control and Prevention (CDC) specifications, American National Standards Institute (ANSI) specifications, National Fire Prevention Association (NFPA) specifications, and internal specifications.

15. The computer system of claim 11, further comprising:
    receiving the camera feed of the facility from a facility manager device; and
    providing the facility manager device with a report of the safety violation detected in the facility, wherein the report indicates a timeframe for correcting the safety violation detected in the facility.

16. The computer system of claim 11, wherein a risk assessment score is assigned to the safety violation detected in the facility; and
    wherein the predetermined proximity is based on the risk assessment score associated with the safety violation detected in the facility.

17. The computer system of claim 16, wherein the risk assessment score is assigned to the safety violation based on a risk assessment matrix associated with an accident occurrence likelihood and a severity of consequence.

18. The computer system of claim 11, further comprising:
generating an initial alert for the user device responsive to determining that the user device is entering the facility including the safety violation.

19. The computer system of claim 11, wherein the generated proximity alert is responsive to determining that the safety violation detected in the facility includes a risk assessment score that is above a risk assessment threshold.

20. A computer program product for safety violation detection, comprising:
one or more computer-readable storage media and program instructions collectively stored on the one or more computer-readable storage media, the program instructions executable by a processor to cause the processor to perform a method comprising:
receiving a camera feed of a facility;
analyzing the received camera feed using an artificial intelligence (AI) model to detect a safety violation in the facility;
tracking a position of a user device in the facility, wherein the user device is associated with a user moving through the facility;
generating a proximity alert responsive to determining that the tracked position of the user device is within a predetermined proximity of the safety violation in the facility; and
outputting the generated proximity alert to the user device for preventative action by the user to avoid the safety violation in the facility.

* * * * *